(12) United States Patent
Ito et al.

(10) Patent No.: US 6,294,774 B1
(45) Date of Patent: Sep. 25, 2001

(54) SCANNING PROBE MICROSCOPE HAVING GRAPHICAL INFORMATION

(75) Inventors: Takashi Ito; Keiichi Nakamoto, both of Tokyo (JP)

(73) Assignee: Jeol Ltd., Tokyo (JP)

( * ) Notice: Subject to any disclaimer, the term of this patent is extended or adjusted under 35 U.S.C. 154(b) by 0 days.

(21) Appl. No.: 09/434,234

(22) Filed: Nov. 5, 1999

(30) Foreign Application Priority Data

Nov. 16, 1998 (JP) ................................... 10-324980

(51) Int. Cl.⁷ ....................................... G02B 7/04
(52) U.S. Cl. ........................................ 250/201.3; 250/307
(58) Field of Search .............................. 250/201.3, 201.5, 250/306, 307, 235, 559.38; 356/375, 373

(56) References Cited

U.S. PATENT DOCUMENTS 5,359,417 * 10/1994 Muller et al. ........................ 356/375
5,481,908   1/1996 Gamble ................................. 73/105

* cited by examiner

Primary Examiner—Que T. Le
(74) Attorney, Agent, or Firm—Webb Ziesenheim Logsdon Orkin & Hanson, P.C.

(57) ABSTRACT

There is disclosed a scanning probe microscope, such as an atomic force microscope or a friction force microscope, permitting an operator to easily adjust the position on a photodiode hit by light. The microscope includes an optical detector having a light-sensitive portion that is circular or polygonal and consists of a photodiode. The profile of the photodiode or graphical information about the photodiode is stored in memory. The photodiode is segmented into four elements. A calculator finds the center of the light incident on the photodiode from the output signals from the four elements. A picture of the photodiode is displayed on the viewing screen of a display unit according to the graphical information about the photodiode stored in memory. A marker indicating the incident position of the light is superimposed on the picture of the photodiode displayed on the viewing screen.

6 Claims, 4 Drawing Sheets

SCANNING PROBE MICROSCOPE HAVING GRAPHICAL INFORMATION

BACKGROUND OF THE INVENTION

1. Field of the Invention

The present invention relates to a scanning probe microscope, such as an atomic force microscope or a friction force microscope.

2. Description of the Related Art

In an atomic force microscope, a force exerted between a cantilever and a sample induces a mechanical displacement of the cantilever. Generally, the displacement is measured with an optical lever. In this scheme, a focused laser beam is made to hit the back surface of the cantilever. The reflected light is detected by a photodiode that is segmented into four parts, for example. Thus, the displacement of the cantilever is measured.

When no force is exerted between the cantilever and the sample, it is important that the laser light reflected off the cantilever impinge on the proper position of the light-sensitive surface of the photodiode, i.e., its center. An adjustment for this is made by a human operator who adjusts the position of the photodiode while directly viewing the light-sensitive surface of the photodiode such that the laser light hits the center of the surface.

However, the photodiode is small and so it is very difficult to adjust the position in such a way that the laser light hits the center of the surface.

SUMMARY OF THE INVENTION

It is an object of the present invention to provide a scanning probe microscope that facilitates adjusting the position on the photodiode hit by light.

The above-described object is achieved in accordance with the teachings of the present invention by a scanning probe microscope in which light emitted from a light source is directed to a cantilever and light reflected off the cantilever is detected with an optical detector to measure the displacement of the cantilever. This scanning probe microscope comprises: information-finding means for finding information about the position on the light-sensitive portion of the optical detector hit by the light, based on the output from the light-sensitive portion; storage means for storing graphical information about the light-sensitive portion; and control means for displaying a picture of the light-sensitive portion, based on the graphical information stored in the storage means and for displaying a marker indicating the position on the light-sensitive portion hit by the light, based on output from said information-finding means, in such a way that the marker is superimposed on the picture of the light-sensitive portion.

Other objects and features of the invention will appear in the course of the description thereof, which follows.

DESCRIPTION OF THE PREFERRED EMBODIMENT

Figure 1:
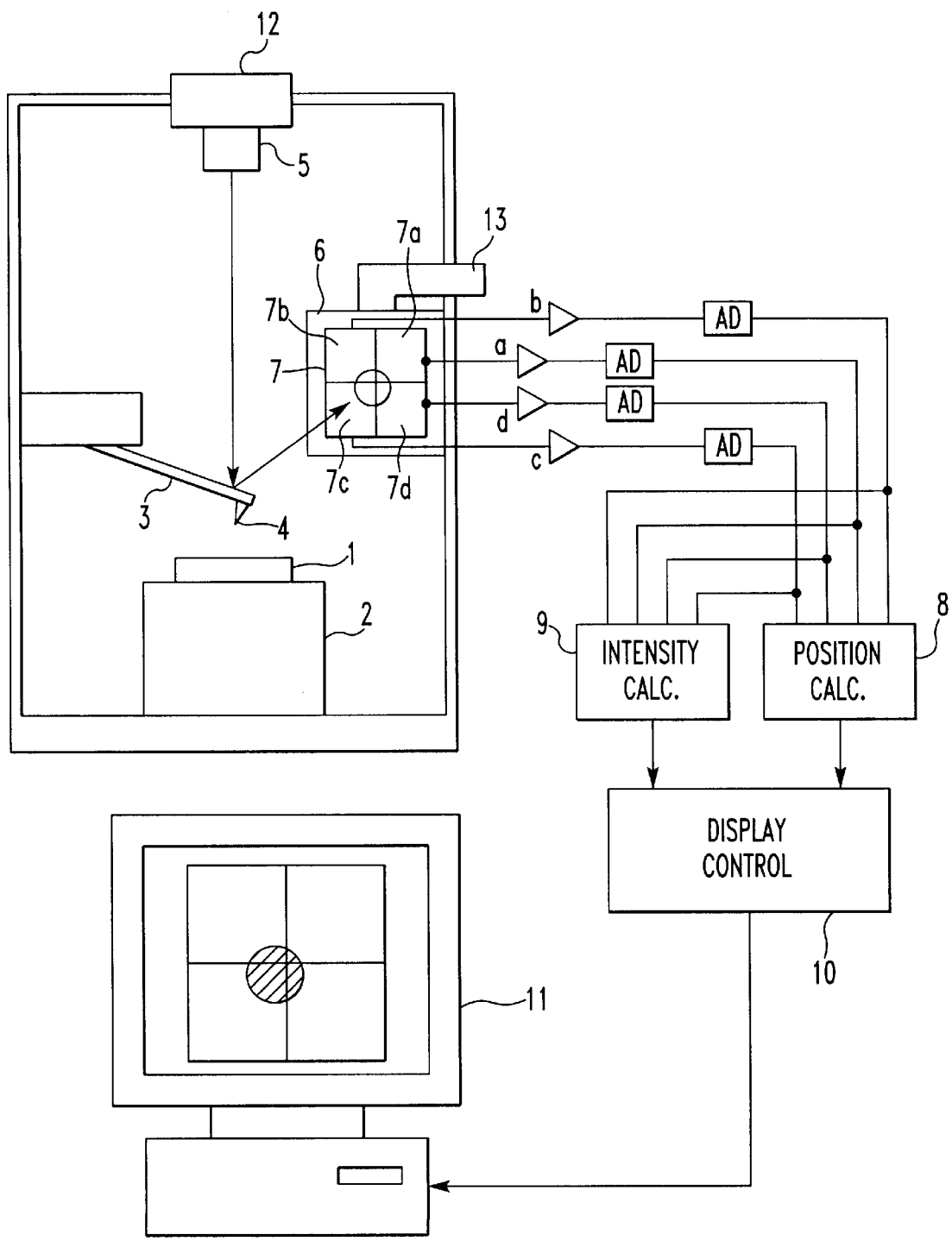
FIG. 1 is a schematic view of an atomic force microscope in accordance with the present invention.

An atomic force microscope, in accordance with the present invention, is schematically shown in FIG. 1. This microscope has a sample-translating means 2 capable of moving in the X-, Y-, and Z-directions. A sample 1 to be investigated is placed on the sample-translating means 2. A cantilever 3 is positioned opposite to the sample 1. A probe 4 is attached to the tip of the cantilever 3.

A light source 5 emits laser light that impinges on the back surface of the cantilever 3 and is reflected from it. The reflected light is detected by the light-sensitive portion of an optical detector 6. The light-sensitive portion, indicated by 7, consists of a photodiode and is segmented into four elements 7a–7d, which produce output signals a–d, respectively. These output signals a–d from the light-sensitive elements 7a–7d are amplified by their respective amplifiers and converted into digital form. Then, the signals are supplied to a light incident position-calculating means 8 and to a light intensity-calculating means 9. The output signal from the light incident position-calculating means 8 and the output signal from the light intensity-calculating means 9 are fed to a display control means 10, which controls a display unit 11 according to the incoming signals.

A light source-adjusting means 12 acts to adjust the amount of light emitted from the light source 5 and to move or tilt the light source 5. An optical detector-adjusting means 13 serves to move the photodiode 7.

In this structure, the position (referred to herein as the incident position) on the photodiode 7 hit by the laser light is adjusted in the manner described below. During adjustment, the sample 1 is kept away from the cantilever 3 such that no force is exerted between the cantilever 3 and the sample 1. Under this condition, laser light is made to impinge on the cantilever 3. The laser light reflected from the back surface of the cantilever 3 is detected by the light-sensitive elements 7a–7d of the photodiode 7. These light-sensitive elements 7a–7d convert the detected light signals into electrical signals and produce the output signals a–d, respectively. These output signals a–d are fed to the light incident position-calculating means 8 and to the light intensity-calculating means 9 via amplifiers and A/D converters.

When signals arrive from the light-sensitive elements, the light incident position-calculating means 8 calculates the center position of the light incident on the photodiode 7 from the ratios of the signal intensities from the light-sensitive elements. This method of calculating the center position of the incident light is next described in detail.

If it is assumed that the light-sensitive elements 7a, 7b, 7c, and 7d produce output signals a, b, c, and d, respectively, as described above, the sum (St) of the output signals is given by:

$$St = a + b + c + d$$

The ratio of the amount of laser light falling on the light-sensitive element 7a to the total amount of light is $a/St = k_a$. The ratio of the amount of laser light falling on the light-sensitive element 7b to the total amount of light is $b/St = k_b$. The ratio of the amount of laser light falling on the light-sensitive element 7c to the total amount of light is $c/St = k_c$. The ratio of the amount of laser light falling on the light-sensitive element 7d to the total amount of light is $d/St = k_d$. Note that $k_a + k_b + k_c + k_d = 1$.

Figure 2:
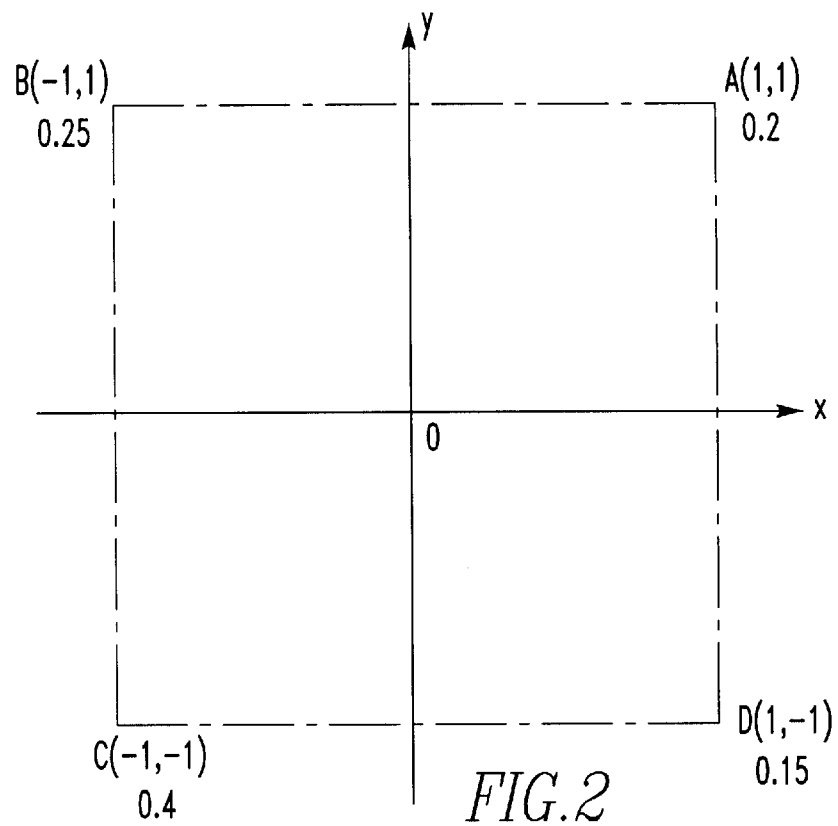
FIGS. 2–5 diagrams illustrating the operation of a light incident position-calculating means incorporated in the microscope shown in FIG. 1.

It is assumed that $k_a = 0.2$, $k_b = 0.25$, $k_c = 0.15$, and $k_d = 0.4$. As shown in FIG. 2, the light incident position-calculating means 8 makes the signals $k_a$, $k_b$, $k_c$, and $k_d$ correspond to coordinates A(1, 1), B(−1, 1), C(−1, −1), and D(1, −1), respectively. Assuming that objects having weights of $k_a$, $k_b$, $k_c$, and $k_d$, respectively, are placed at the coordinates A, B, C, and D, respectively, the light incident position-calculating means 8 finds the position of center of gravity. The found position of center of gravity is taken as the center position of the light incident on the photodiode 7.

Figure 3:
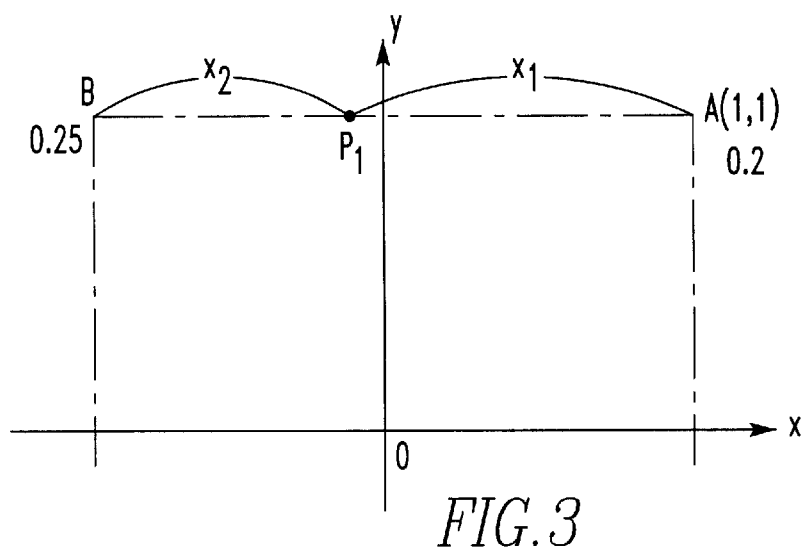

In particular, the light incident position-calculating means 8 finds the position of center of gravity $P_1$ between the points A and B. In this case, as shown in FIG. 3, assuming that $x_1$ and $x_2$ are the distances between $P_1$ and A and between $P_1$ and B, respectively, taken along the X-axis, the following relations hold:

$$x_1 + x_2 = 2 \tag{1}$$

and $$0.2\, x_1 = 0.25\, x_2 \tag{2}$$

The light incident position-calculating means 8 finds $x_2=0.4/0.45$ from Eqs. (1) and (2). Then, the calculating means finds the coordinate $(-1+0.4/0.45, 1)$ of the center of gravity $P_1$.

Figure 4:
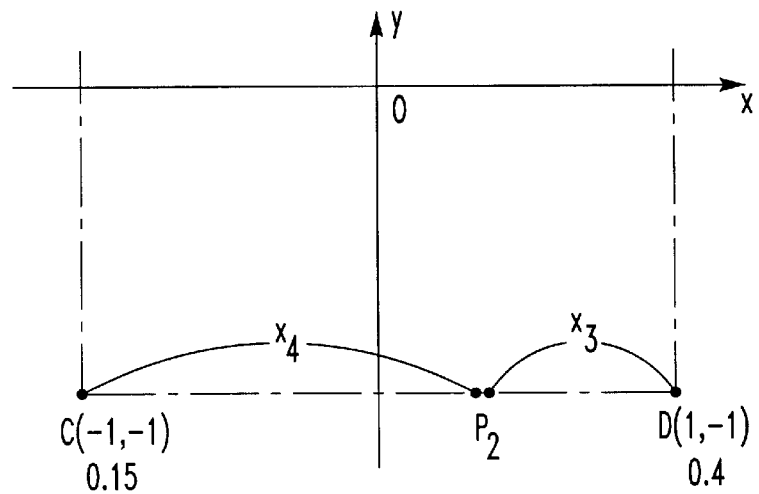

Then, the light incident position-calculating means 8 finds the position of the center of gravity $P_2$ between the points C and D. As shown in FIG. 4, let $X_3$ and $X_4$ be the distances between $P_2$ and D and between $P_2$ and C, respectively, taken along the X-axis. Thus, we have $$X_3 + x_4 = 2 \tag{3}$$

$$0.4\, X_3 = 0.15\, X_4 \tag{4}$$

The light incident position-calculating means 8 finds the distance $X_4=0.8/0.55$ from Eqs. (3) and (4) and calculates the coordinate $(-1+0.8/0.55, -1)$ of the center of gravity $P_2$.

Figure 5:
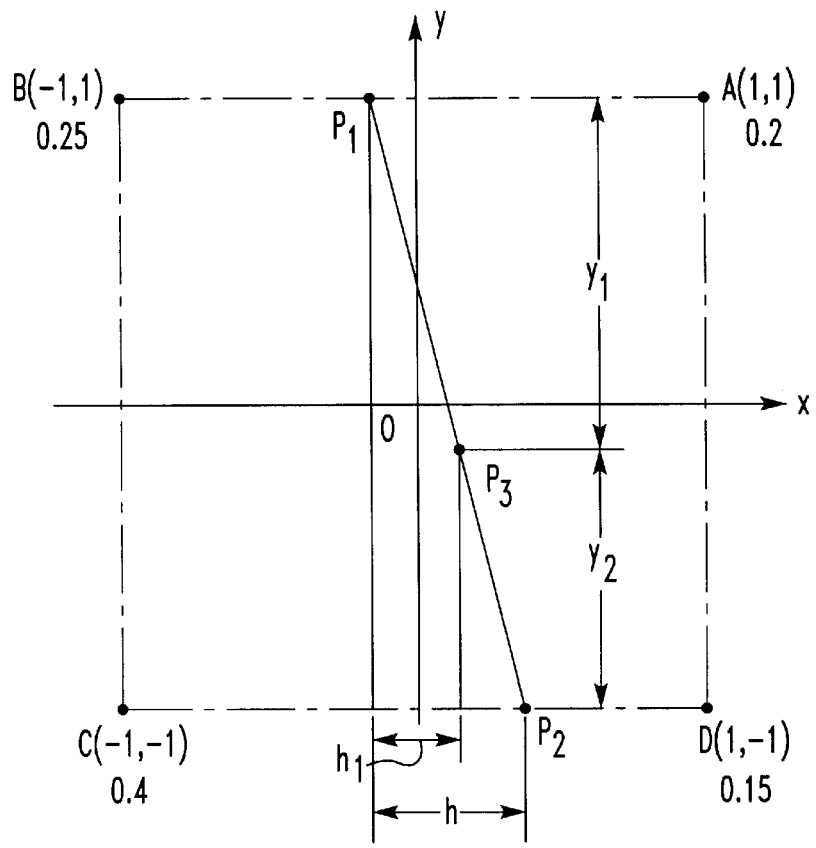

Then, the light incident position-calculating means 8 finds the final position of center of gravity $P_3$, i.e., the center position $P_3$ of the incident light, from the found centers of gravity $P_1$ and $P_2$. As shown in FIG. 5, let $Y_1$ be the distance between $P_3$ and $P_1$ taken along the Y-axis. Let $Y_2$ be the distance between $P_3$ and $P_2$ taken along the Y-axis. Thus, we have $$Y_1 + Y_2 = 2 \tag{5}$$

and $$(k_a + k_b)\, y_1 = (k_c + k_d)\, Y_2$$

That is, $$0.45\, y_1 = 0.55\, Y_2 \tag{6}$$

The light incident position-calculating means 8 finds $Y_2=0.9$ from Eqs. (5) and (6). Also, the light incident position-calculating means 8 finds the y-coordinate $(-1+0.9=-0.1)$ of the center of gravity $P_3$.

In order to find the x-coordinate of the center of gravity $P_3$, the light incident position-calculating means 8 subtracts the x-coordinate of $P_1$ from the x-coordinate of $P_2$, thus calculating the distance h $(=0.8/0.55-0.4/0.45)$ between $P_1$ and $P_2$ along the X-axis. Then, the light incident position-calculating means 8 finds the distance $h_1$, between $P_3$ and $P_1$, along the X-axis using $$0.45\, h_1 = 0.55\, (h - h_1) \tag{7}$$

The x-coordinate $((-1+0.4/0.45)+0.55\,(0.8/0.55-0.4/0.45))$ of the center position $P_3$ is found from the found $h_1=0.55\,(0.8/0.55-0.4/0.45)$.

After the light incident position-calculating means 8 finds the center position $P_3$ of the incident light on the photodiode 7 in this way, a signal indicating this center position is sent to the display control means 10.

The light intensity-calculating means 9 adds up the output signals from the light-sensitive elements and calculates the intensity of the incident light on the photodiode 7. A signal representing the intensity of the incident light is sent to the display control means 10.

The display control means 10 stores the graphical information about the photodiode 7 that is the light-sensitive portion. An enlarged view of the photosensitive surface of the four-segmented photodiode 7 is displayed on the viewing screen of the display unit 11 under control of the display control means 10. When a signal representing the center position of the incident light on the photodiode 7 as described above arrives from the light incident position-calculating means 8, a circular marker centered at the above-described center position is superimposed on the enlarged view of the photosensitive portion described above.

As a result, the operator can know the incident position of the laser light on the photodiode 7. The operator then adjusts the optical detector-adjusting means 13 to bring the center of the marker into the middle of the view of the photosensitive surface. This adjustment is very easy to make. Hence, the laser light can hit the center of the photodiode 7 accurately.

The display control means 10 can display the intensity of the light sent from the light intensity-calculating means 9 in different colors, depending on different ranges of the intensity of the light. For example, if the intensity of the incident light is appropriate, the marker is displayed in green. If the intensity is too high, the marker is displayed in red. If the intensity is too low, the marker is displayed in yellow. In FIG. 1, the inside of the circular marker is hatched. In practice, this hatched portion is displayed in colors corresponding to different ranges of the intensity of the incident light.

Owing to this color representation, the operator can know whether the intensity of the laser light on the photodiode 7 is appropriate or not. The operator adjusts the light source-adjusting means 12 while viewing the colors of the marker.

Where the amount of light emitted from the light source 5 is large, the intensity of the incident light is high. In this case, the life of the light source 5 shortens. If the intensity of the incident light is too low, the signal-to-noise ratio (S/N) deteriorates, thus lowering the accuracy of the measurement of forces. To avoid these problems, the aforementioned adjustment of the light source is made.

While the operation of the instrument shown in FIG. 1 has been described, if the marker consists of coaxial circles, a mark "+" is placed in the center of the marker, or the center of the marker is increased in brightness compared with other portions, i.e., the center of the marker is more intelligible.

Figure 6:
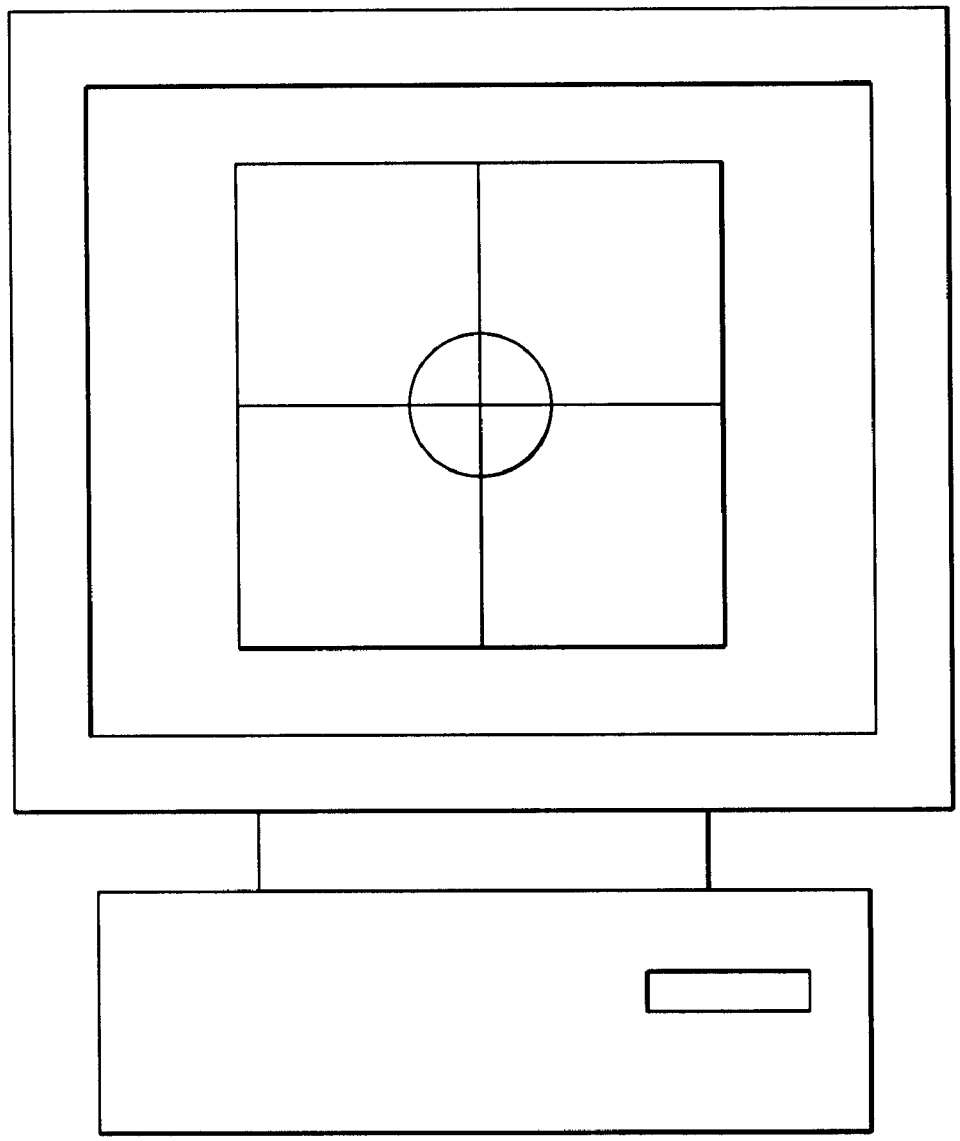
FIG. 6 is a view showing a marker displayed on a display unit incorporated in the microscope shown in FIG. 1.

In the example given above, the marker is circular in shape. It may also be polygonal, such as square. Also, in the above example, different ranges of the intensity of the incident light are represented in terms of different colors. Alternatively, the diameter of a circular marker or the size of a polygonal marker may be varied according to different ranges of intensity of incident light. The operator may adjust the light source-adjusting means such that the marker assumes a given size. Where a marker indicating the optimum intensity is displayed in the center of the view of the light-sensitive surface as shown in FIG. 6, the adjustment is easier to perform.

Furthermore, the light-sensitive portion of the optical detector may be segmented into more than four elements. Information indicating whether each element is illuminated with light is sent to the display control means. Based on the information, a marker indicating the incident position on the light-sensitive portion may be superimposed on the view of the light-sensitive portion.

In addition, the present invention is not limited to an atomic force microscope. The invention can also be applied to a friction force microscope or the like that detects forces using a cantilever.

Having thus described our invention with the detail and particularity required by the Patent Laws, what is desired protected by Letters Patent is set forth in the following claims.

What is claimed is:

1. A scanning probe microscope having a light source emitting light toward a cantilever and an optical detector for detecting light reflected from the cantilever to measure displacement of the cantilever, said optical detector having a light-sensitive portion producing output signals, said scanning probe microscope comprising:

information-finding means for finding information about a position on said light-sensitive portion hit by the light from the output signals from said light-sensitive portion;

storage means for storing graphical information about said light-sensitive portion;

a display means having a viewing screen; and a control means for displaying a picture of said light-sensitive portion on the viewing screen of said display means according to graphical information stored in said storage means and for superimposing a marker on said picture of said light-sensitive portion according to output from said information-finding means, said marker indicating the position on said light-sensitive portion hit by the light.

2. The scanning probe microscope of claim 1, wherein said light-sensitive portion of said optical detector is segmented into plural elements producing output signals, respectively, and wherein information about the position on said light-sensitive portion hit by the light is found from the output signals from said elements of said light-sensitive portion.

3. The scanning probe microscope of claim 1 or 2, wherein said marker is displayed in different colors according to a different range of output intensity from said light-sensitive portion.

4. The scanning probe microscope of claim 1, wherein said marker is circular or polygonal in shape, and wherein the size of said marker is varied according to output intensity from said light-sensitive portion.

5. The scanning probe microscope of claim 2, wherein said marker is circular or polygonal in shape, and wherein the size of said marker is varied according to output intensity from said light-sensitive portion.

6. The scanning probe microscope of claim 4 or 5, wherein a marker having a given size and indicating an optimum intensity is previously displayed on the viewing screen of said display means.

* * * * *